(12) United States Patent
Zhu

(10) Patent No.: US 9,661,839 B2
(45) Date of Patent: May 30, 2017

(54) CAGE HAVING AN AUTOMATIC DOOR

(71) Applicant: Hongwen Zhu, Shanghai (CN)

(72) Inventor: Hongwen Zhu, Shanghai (CN)

( * ) Notice: Subject to any disclaimer, the term of this patent is extended or adjusted under 35 U.S.C. 154(b) by 181 days.

(21) Appl. No.: 14/644,208

(22) Filed: Mar. 11, 2015

(65) Prior Publication Data
US 2016/0198697 A1 Jul. 14, 2016

(30) Foreign Application Priority Data

Jan. 8, 2015 (CN) .................... 2015 2 0010190 U

(51) Int. Cl.
*A01M 23/00* (2006.01)
*A01M 23/20* (2006.01)
*A01M 23/08* (2006.01)
*A01M 23/18* (2006.01)

(52) U.S. Cl.
CPC ............ *A01M 23/20* (2013.01); *A01M 23/08* (2013.01); *A01M 23/18* (2013.01)

(58) Field of Classification Search
USPC ....................................... 43/61, 60
See application file for complete search history.

(56) References Cited

U.S. PATENT DOCUMENTS 4,179,835 A * 12/1979 Hunter .................. A01M 23/18
43/61
4,899,484 A * 2/1990 Morin .................... A01M 23/20
43/61
8,646,204 B2 2/2014 Chiu
8,776,430 B1 7/2014 Kamery
(Continued)

FOREIGN PATENT DOCUMENTS

EP 1971201 12/2009
GB 2095087 A * 9/1982 ............ A01M 23/18

*Primary Examiner* — Christopher P Ellis
(74) *Attorney, Agent, or Firm* — Treasure IP Group, LLC

(57) ABSTRACT

A cage having an automatic door is described. A front side of the cage is provided with a door panel. A top edge of the door panel is hingely attached to the cage. A bottom edge of the door panel is attached to the cage through a spring. A pedal is provided on a bottom surface of the cage. A front side of the pedal is hingely attached to the cage. The pedal is connected with a connecting rod. An upper end of the connecting rod extends upward and forward along a sidewall of the cage and is bent towards an exterior of the door panel. A spring supporting seat is fixed on the sidewall of the cage. Said spring supporting seat is connected with a spring. The connecting rod is fixedly provided with a spring contact point. Spring can move the connecting rod up toward the top of the cage and forward toward the front of the cage to lift up the pedal. A hook is fixedly provided on an outer surface of the door panel. An opening of the hook faces the top of the cage. When the door panel is in its fully open position, a bending portion of the upper end of the connecting rod locks into the hook. When the pedal is pressed down, the connecting rod is pulled downwardly and detached from the hook. The door panel moves down automatically to close the cage. In case of trigger mechanism failure, the door panel can be lifted by one hand, and quickly and automatically locks in position to restart, no other manual adjustment is needed.

8 Claims, 2 Drawing Sheets

(56) References Cited

U.S. PATENT DOCUMENTS

| | | | |
|---|---|---|---|
| 2006/0218849 A1* | 10/2006 | Rich | A01M 23/18 |
| | | | 43/61 |
| 2008/0282600 A1* | 11/2008 | Rich | A01M 23/24 |
| | | | 43/61 |
| 2009/0094882 A1 | 4/2009 | Comstock | |
| 2009/0211146 A1* | 8/2009 | Radesky | A01M 23/18 |
| | | | 43/61 |
| 2014/0208633 A1 | 7/2014 | Pletcher | |
| 2015/0245603 A1* | 9/2015 | Marks | A01M 23/18 |
| | | | 43/61 |
| 2016/0135444 A1* | 5/2016 | Pomerantz | A01M 23/20 |
| | | | 43/61 |

* cited by examiner

CAGE HAVING AN AUTOMATIC DOOR

CROSS REFERENCE TO RELATED APPLICATIONS

This application claims the benefit of a Chinese application 201520010190.5, filed Jan. 8, 2015. The subject matter as set forth in the Chinese application is incorporated herein by reference in its entirety.

TECHNICAL FIELD

The invention relates to a mechanical apparatus, in particular relates to a tool to capture an animal, particularly a trap having an automatic door.

BACKGROUND OF THE INVENTION

For manufacturing, everyday living and research purpose, sometimes it is needed to capture a small live animal. In the prior art, a valve type automatic door traps are used to capture the fox, mink, squirrels and other small animals. This kind of valve type automatic door trap comprises a cuboid shaped metal wire braided cage, having a front opening, the front opening of the cage is provided with a door panel, the upper edge of the door panel is connected with the cage by a hinge structure, a spring device is arranged between the lower edge of the door panel and the cage, the spring device make the lower edge of the door panel to lean towards the bottom surface of the cage, in order to close the cage. The bottom surface inside the cage is provided with a pedal, and the front side of the pedal and the cage bottom surface are connected through another hinge structure, a trigger mechanism is arranged between the pedal and the door panel. The lower edge of the door panel is raised manually to open the front side of the cage, lock the door panel at a ready position by a triggering mechanism, the back side of the pedal and trigger mechanism is linked and will be up lifted up in response to a trigger. Inside the cage, at the back end, bait is provided. When a little animal target gets into the cage, looking for the small animal bait, the forelimbs of the animal steps on the pedal and when the pedal receives pressure trigger mechanism linked with the pedal is activated, the door panel is unlocked and the front opening of the cage is closed as the door panel is lean toward the cage by the spring device, therefore the small animal is shut in the cage. A backstop mechanism is also arranged between the door panel and the cage, to prevent the forces from inside of the cage to make the door panel open. In the prior arts, the trigger mechanism between the pedal and the door panel often fails due to rust or the tight arrangement of trigger mechanism. Moreover, locking the door panel in a ready position manually adds a level of complexity in its everyday use.

SUMMARY OF THE INVENTION

The present invention is to provide a cage having an automatic door. The cage has solved the problems in the prior arts that the valve type of door can cause failure due to the trigger mechanism and locking the door in a ready position manually adding a level of complexity in its operation.

The present invention discloses a cage having an automatic door. The cage comprises a cuboid shaped cage. A front side of said cage is provided with an opening. A door panel is disposed at the front opening and inside the cage. The door panel has a length greater than a height of the cage. A top edge of the door panel is placed inside the cage, connected to a top surface of the cage through a hinge structure. A spring device is arranged between a lower edge of the door panel and the cage, and the spring device makes the lower edge of the door panel lean towards a bottom surface of the cage. A pedal is disposed on the bottom surface inside the cage. A front edge of the pedal is connected to the bottom surface of the cage through another hinge structure. Wherein, the pedal is connected with a connecting rod. A pair of rotation joints is placed between a lower end of the connecting rod and the pedal. An upper end of the connecting rod extends upward and forward along a sidewall of the cage and bends towards outside of the door panel. A spring supporting seat is fixed on the sidewall of the cage; said spring supporting seat is connected with a spring. The connecting rod is fixed with a spring contact point. One end of the spring can act upon the spring contact point. The spring can make the connecting rod lean towards the top and front of the cage through the spring contact point. A hook is fixed on an outer surface of the door panel. An opening of the hook faces towards the top of the cage, when the door panel is in its fully open position, a bending portion at the upper end of the connecting rod locks into the hook.

Further, the spring supporting seat is arranged on the outside of the sidewall of the cage, a middle portion of the connecting rod is located on the outside of the sidewall of the cage.

Further, the outside of the sidewall of the cage is provided with a position-limiting ring, the connecting rod passes through the position-limiting ring.

Further, the spring supporting seat is provided with a through hole, the connecting rod passes through the through hole, the spring is connected with the connecting rod by a spring contact point, which is made of a convex ring fixed on the connecting rod, and the spring is positioned between the convex ring and the spring supporting seat.

Further, an upper exterior of the hook has a slope.

Further, the spring device comprises a second spring, one end of the second spring is connected to the door panel on the lower edge, and the other end of the second spring is located between the top edge of the door panel and the top surface of the cage.

Further, the cage is made of welded metal wires arranged in a latitude and longitude manner.

Further, on the top and front of the cage a backstop hook is provided, wherein a root portion of the backstop hook are connected to the cage through a pair of rotating joints, and a hook portion of the backstop hook can suspend and drape over the top edge of the door panel.

The working principle of the present invention is the following. After lifting a lower end of the door panel up toward the top of the cage, the second spring is compressed to store compression energy. Then the bending portion at the upper end of the connecting rod moves and slides along the top and exterior of the hook and locks into the hook when the first spring acts upon it, so as to preventing the door panel revert back to its original position. In the mean time, the lower portion of the connecting rod lifts up the back end of the pedal and the back end of the pedal is suspended. The first spring helps to sustain the position of the connecting rod and the cage is prepared in its ready position. Bait is placed inside the cage at the end. When a little animal enters into the cage from the front opening, looking for the bait, its forelimbs will step on the pedal and press down, the pedal will move and bring the connecting rod downwardly with it. The bending portion at the upper end of the connecting rod will escape from the hook in order to overcome the strength of the first spring. The door panel will return to its original position because of the second spring and the cage is automatically shut. The door panel can only be reopened by pushing manually from the outside of the cage. A hook is provided on the exterior surface of the door panel. The opening of the hook faces the top of the cage. When the door panel is in its fully open position, the bending portion at the upper end of the connecting rod locks into the hook.

Comparing the cage disclosed by the present invention with the prior arts, the advantages are positive and obvious. The present invention utilizes a lock structure formed between the bending portion at the upper end of the connecting rod and the hook on the door panel, utilize a spring to sustain the connecting rod still, utilize the lower end of the connecting rod and pedal to form a trigger structure, which all have overcome the failure caused by rusty or tightly fixed trigger mechanism. In the meantime, placing the door panel in its ready position is simple and quick, including lifting up the door panel by one hand, the door panel will lock in position quickly at an open state, no other minor adjustment is needed.

DETAILED DESCRIPTION OF THE PREFERRED EMBODIMENTS

Example 1

Figure 1:
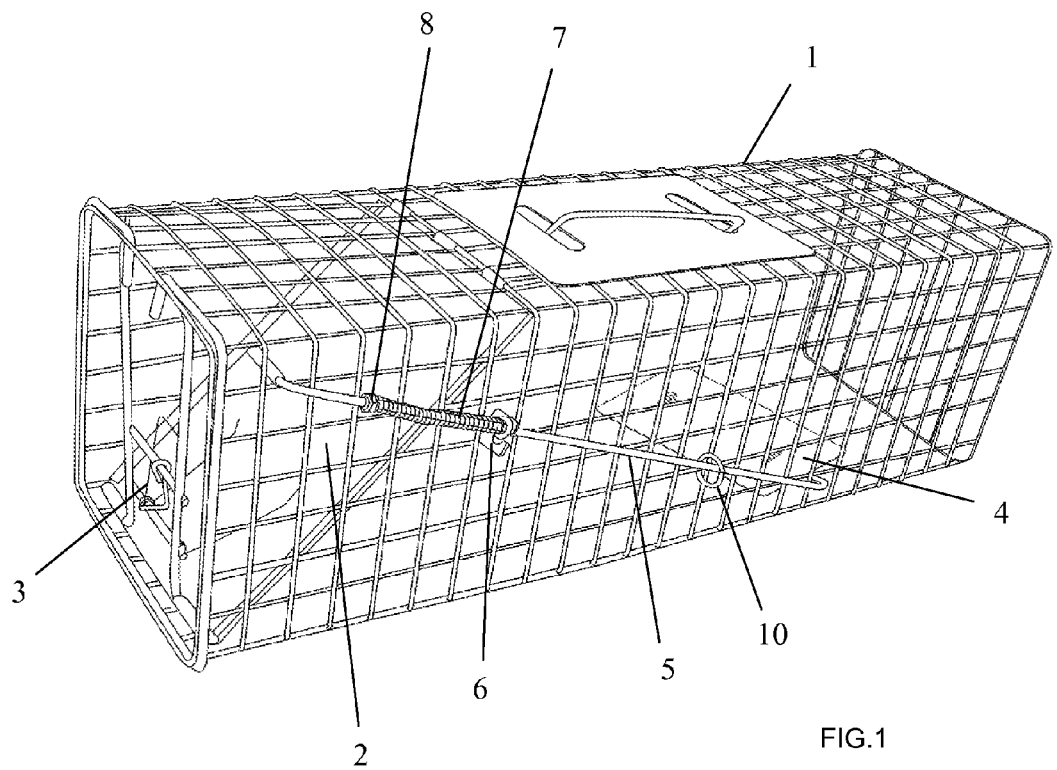
FIG. 1 is an illustration of the cage having an automatic door, in accordance with the aspects of the present invention.

As shown in FIG. 1, the cage having an automatic door disclosed by the present invention, comprises a cuboid shaped cage 1. A front side of said cage 1 is provided with an opening. A door panel 2 is disposed at the front opening and inside the cage 1. The door panel 2 has a length greater than a height of the cage 1. A top edge of the door panel 2 is placed inside the cage 1, connected to a top surface of the cage 1 through a hinge structure. A spring device 3 is arranged between a lower edge of the door panel 2 and the cage 1, and the spring device 3 makes the lower edge of the door panel 2 lean towards a bottom surface of the cage 1. A pedal 4 is disposed on the bottom surface inside the cage 1. A front edge of the pedal 4 is connected to the bottom surface of the cage 1 through another hinge structure. Wherein, the pedal 4 is connected with a connecting rod 5. A pair of rotation joints is placed between a lower end of the connecting rod 5 and the pedal 4. An upper end of the connecting rod 5 extends upward and forward along a sidewall of the cage 1 and bends towards outside of the door panel 2. A spring supporting seat 6 is fixed on the sidewall of the cage 1; said spring supporting seat 6 is connected with a spring 7. The connecting rod is fixed with a spring contact point 8. One end of the spring 7 can act upon the spring contact point 8. The spring 7 can make the connecting rod 5 lean towards the top and front of the cage 1 through the spring contact point 8. A hook 9 is fixed on an outer surface of the door panel 2. An opening of the hook faces towards the top of the cage 1, when the door panel 2 is in its fully open position, a bending portion at the upper end of the connecting rod 5 locks into the hook 9.

Further, the spring supporting seat 6 is arranged on the outside of the sidewall of the cage 1, a middle portion of the connecting rod 5 is located on the outside of the sidewall of the cage 1.

Further, the outside of the sidewall of the cage 1 is provided with a position-limiting ring 10, the connecting rod 5 passes through the position-limiting ring 10.

Further, the spring supporting seat 6 is provided with a through hole, the connecting rod passes through the through hole, the spring 7 is connected with the connecting rod 5 by a spring contact point 8, which is made of a convex ring fixed on the connecting rod 5, and the spring 7 is positioned between the convex ring and the spring supporting seat 6.

Further, an upper exterior of the hook 9 has a slope.

Further, the spring 7 device 3 comprises a second spring, one end of the second spring is connected to the door panel 2 on the lower edge, and the other end of the second spring is located between the top edge of the door panel 2 and the top surface of the cage 1.

Further, the cage 1 is made of welded metal wires arranged in a latitude and longitude manner.

Further, on the top and front of the cage a backstop hook is provided, wherein a root portion of the backstop hook are connected to the cage 1 through a pair of rotating joints, and a hook portion of the backstop hook can suspend and drape over the top edge of the door panel 2.

Figure 2:
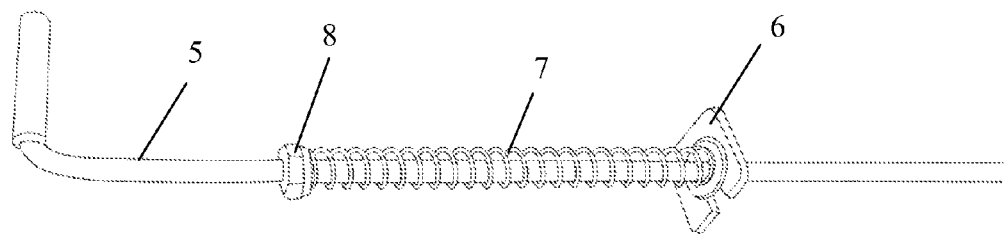
FIG. 2 is an illustration of the cage of the present invention, wherein the cage is its ready position.
Figure 3:
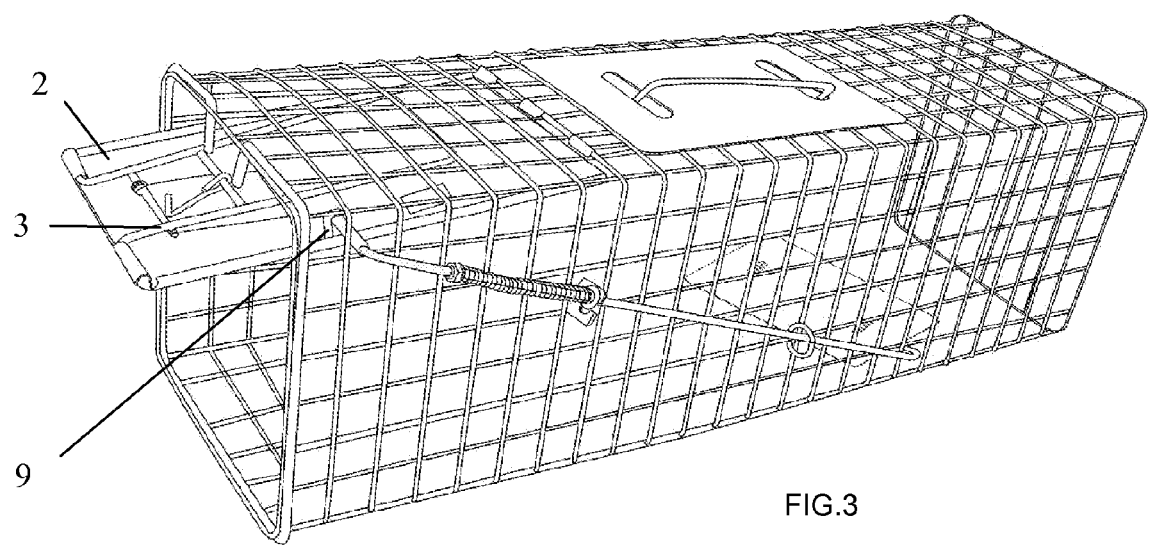
FIG. 3 is an illustration of the connecting rod of the cage in the present invention.

As illustrated in FIG. 2, the working principle of example 1 is the following. After lifting a lower end of the door panel 2 up toward the top of the cage 1, the second spring is compressed to store compression energy. Then the bending portion at the upper end of the connecting rod 5 moves and slides along the top and exterior of the hook 9 and locks into the hook 9 when the spring 7 acts upon it, so as to preventing the door panel 2 revert back to its original position. In the mean time, the lower portion of the connecting rod 5 lifts up the back end of the pedal 4 and the back end of the pedal 4 is suspended. The spring 7 helps to sustain the position of the connecting rod 5 and the cage 1 is prepared in its ready position. Bait is placed inside the cage 1 at the end. When a little animal enters into the cage from the front opening, looking for the bait, its forelimbs will step on the pedal 4 and press down, the pedal 4 will move and bring the connecting rod 5 downwardly with it. The bending portion at the upper end of the connecting rod 5 will escape from the hook 9 in order to overcome the strength of the first spring 7. The door panel will return to its original position because of the second spring and the cage 1 is automatically shut. The door panel 2 can only be reopened by pushing manually from the outside of the cage 1.

I claim:

1. A cage having an automatic door, comprising
a cuboid shaped cage, wherein a front side of said cage is provided with an opening;
a door panel, disposed at the front opening and inside of the cage, wherein the door panel has a length greater than a height of the cage, and a top edge of the door panel is placed inside the cage, connected to a top surface of the cage through a hinge structure;
a spring device, arranged between a lower edge of the door panel and the cage, wherein the spring device can make the lower edge of the door panel lean towards a bottom surface of the cage;
a pedal, disposed on the bottom surface inside the cage, wherein a front edge of the pedal is connected to the bottom surface of the cage through another hinge structure;

the cage is characterized in that: the pedal is connected with a connecting rod;

a pair of rotation joints is placed between a lower end of the connecting rod and the pedal;

an upper end of the connecting rod extends upward and forward along a sidewall of the cage and is bent towards outside of the door panel;

a spring supporting seat is fixed on the sidewall of the cage;

said spring supporting seat is connected with a spring;

the connecting rod is fixed with a spring contact point;

one end of the spring can act upon the spring contact point;

the spring can make the connecting rod lean towards the top and front of the cage through the spring contact point;

a hook is fixed on an outer surface of the door panel;

an opening of the hook faces towards the top of the cage; and when the door panel is in its fully open position, a bending portion at the upper end of the connecting rod locks into the hook.

2. The cage of claim 1, characterized in that the spring supporting seat is arranged on the outside of the sidewall of the cage, a middle portion of the connecting rod is located on the outside of the sidewall of the cage.

3. The cage of claim 2, characterized in that the outside of the sidewall of the cage is provided with a position-limiting ring, the connecting rod passes through the position-limiting ring.

4. The cage of claim 1, characterized in that the spring supporting seat is provided with a through hole, the connecting rod passes through the through hole, the spring is connected with the connecting rod by a spring contact point, which is made of a convex ring fixed on the connecting rod, and the spring is positioned between the convex ring and the spring supporting seat.

5. The cage of claim 1, characterized in that an upper exterior of the hook has a slope.

6. The cage of claim 1, characterized in that the spring device comprises a second spring, one end of the second spring is connected to the door panel on the lower edge, and the other end of the second spring is located between the top edge of the door panel and the top surface of the cage.

7. The cage of claim 1, characterized in that the cage is made of welded metal wires arranged in a latitude and longitude manner.

8. The cage of claim 1, characterized in that on the top and front of the cage a backstop hook is provided, wherein a root portion of the backstop hook is connected to the cage through a pair of rotating joints, and a hook portion of the backstop hook can suspend and drape over the top edge of the door panel.

* * * * *